Patented May 8, 1934

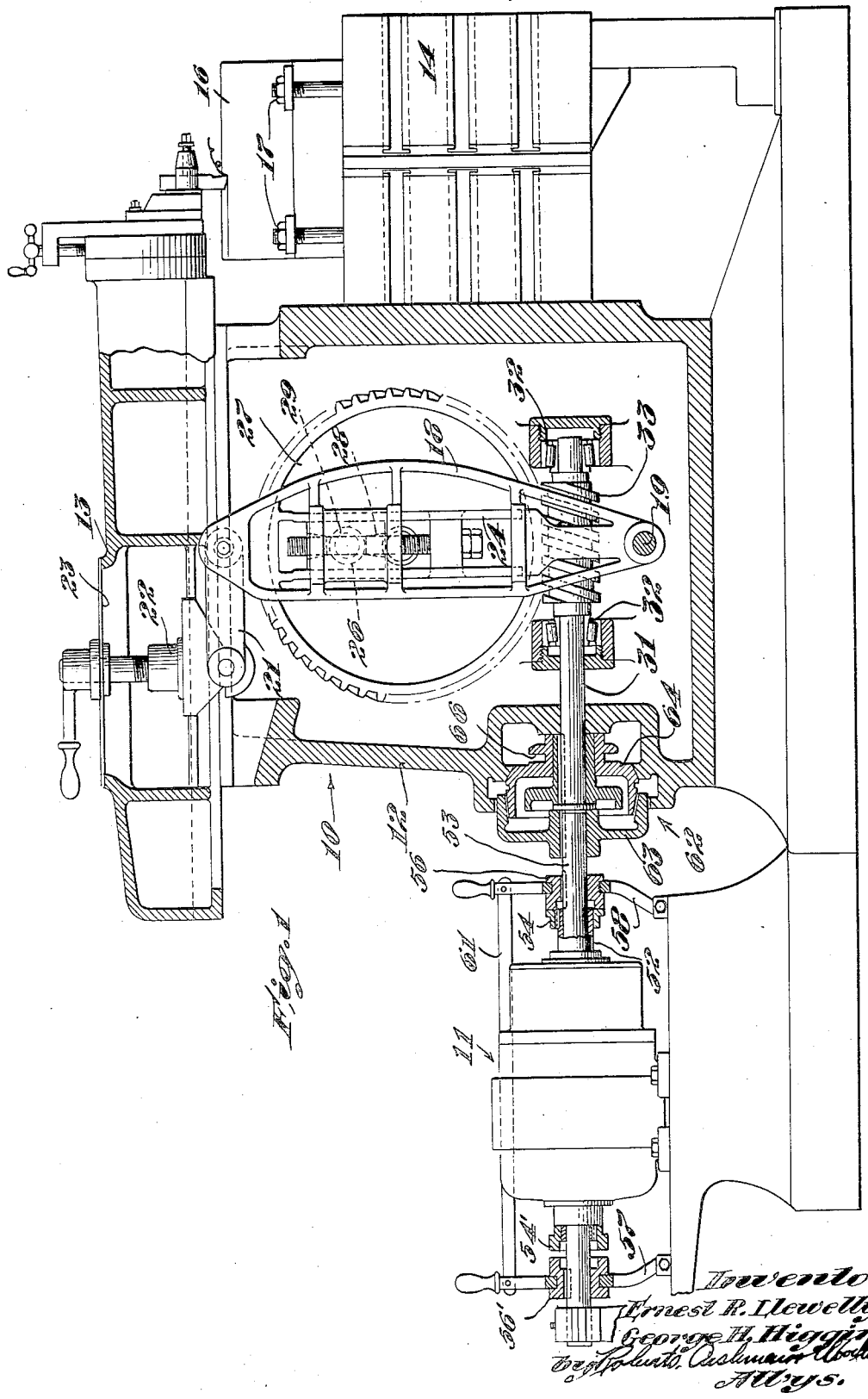

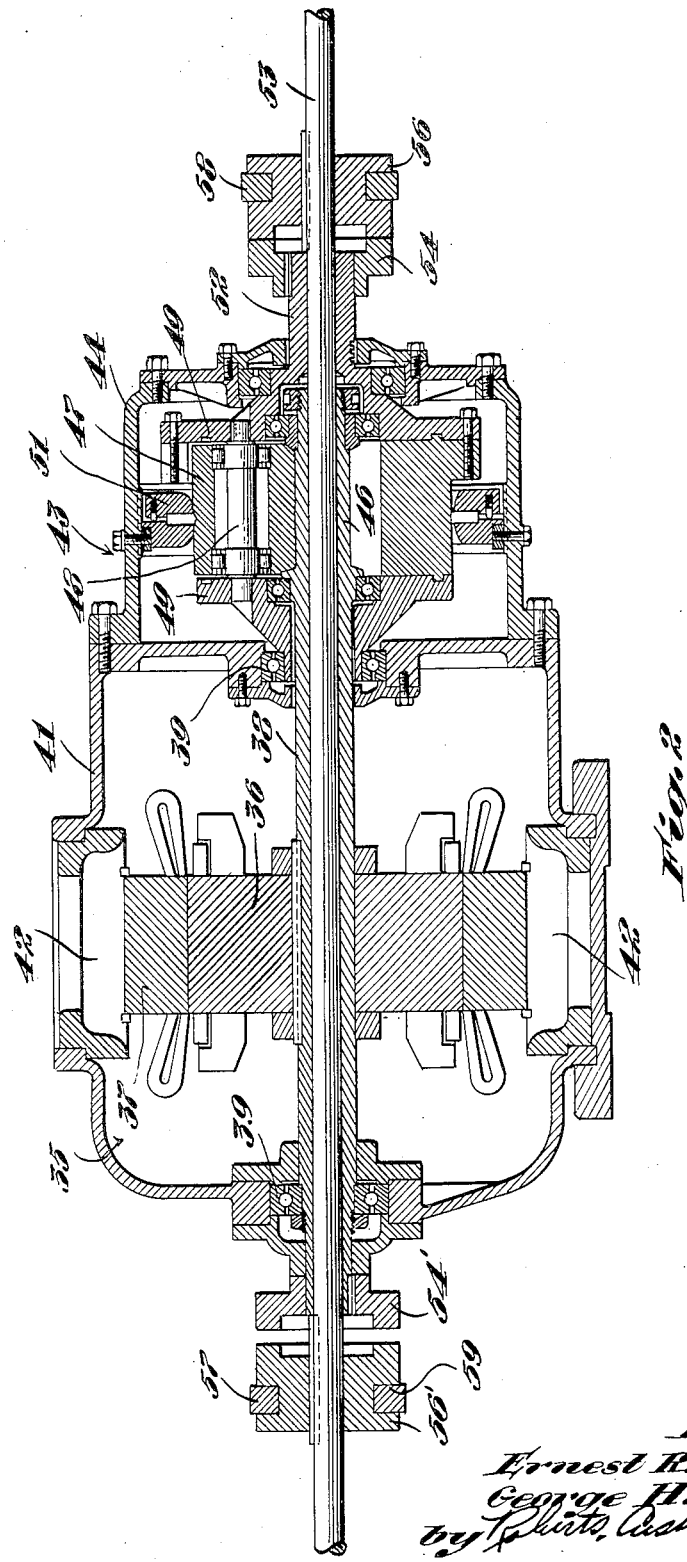

1,958,106

UNITED STATES PATENT OFFICE 1,958,106

SHAPER AND POWER TRANSMITTING MECHANISM THEREFOR

Ernest R. Llewellyn, Arlington, Mass., and George H. Higgins, Torrington, Conn., assignors to The Hendey Machine Company, Torrington, Conn., a corporation of Connecticut Application October 7, 1930, Serial No. 486,948

6 Claims. (Cl. 90—38)

This invention relates to speed-change power-transmitting mechanism as well as to machine tools of the general class of which shapers, milling machines, planers and the like are representative.

It is customary to equip machines of this general character with an individual drive which may comprise a driving motor or other prime mover and reduction gearing. For some classes of work it is sometimes possible to provide a multiple speed driving motor having operating speeds and other characteristics corresponding to those required for certain operations of the machine. Whenever this can be done it is advantageous to transmit power directly from the motor to the machine as this not only avoids any loss of power through gearing, but also eliminates the possibility of chatter marks on the work due to tooth impact of the gearing, and in general tends to improve the operating efficiency. In other cases it may be desirable to increase the utility of a machine by making available a number of lower operating speeds such as may be obtained by using a multiple speed motor with a speed reduction unit.

Difficulty has been encountered with mechanism available heretofore for actuating the operating members of machines of the class described. For instance the ram of a shaper is commonly actuated by apparatus including spur gearing. While theoretically the gear teeth may be formed to assure a rolling contact and a smooth uniform flow of power, it is found in actual practice that impacts sometimes occur as the teeth come into engagement. These impacts cause the transmission of power to be uneven and produce irregularities in the stock being machined. To overcome these undesirable results it has frequently been necessary to lap the gear teeth or to resort to other expensive operations which from a manufacturing point of view it is highly desirable to avoid.

Objects of the present invention are to improve the construction of apparatus of the class described so as to overcome the aforementioned difficulties; to improve the efficiency as well as to increase the utility of speed-change power-transmitting sets by providing for transmitting power either directly from a prime mover or through speed-change mechanism; to improve the operation and to reduce the cost of machine tools of the class referred to by providing improved operating mechanism therefor; to provide improved power delivering and transmitting mechanism preferably in the form of an individual drive unit of general utility which is particularly adapted for use with machines having the aforementioned improvements; and also to provide apparatus of the class described having an improved construction and arrangement of parts.

In the drawings:

Fig. 1 is a side elevation of a shaper equipped with an individual drive change speed unit with certain parts omitted and other parts broken away for purposes of illustration; and Fig. 2 is a central vertical section of the change speed unit shown in Fig. 1.

The apparatus selected for illustrating the features of the invention comprises a shaper indicated generally at 10 and an individual drive unit, indicated generally at 11. The shaper comprises a frame 12 which supports a reciprocable member or ram 13 for working and return strokes thereof. A work table 14 is also provided for supporting stock to be machined, such as a piece of stock 16, which may be clamped to the table by means of retaining bolts 17. A stroke arm 18 is mounted to pivot on the lower portion of the frame at 19. The upper end of this arm is connected by means of a link 21 to an adjustable clamping member 22, which is adapted to occupy various positions longitudinally of the ram, being movable lengthwise thereof through the longitudinal opening or slot 23. The under or rear side of the stroke arm is provided with a guiding channel 24, which slidably receives and retains a block 26. A worm wheel 27 is rotatably mounted upon the frame and operably connected to a crank arm 28. The outer end of this crank arm carries a journal 29 which fits in a complementary recess in the slidable block 26. At the lower side of the worm wheel a shaft 31 is rotatably mounted in suitable bearings 32 carried by the frame. This shaft carries a driving worm 33 which meshes with the worm wheel 27.

The prime mover for operating the shaper is here shown in the form of a multiple speed electric motor indicated generally at 35 and comprising a rotor 36 which carries the armature 37 and is fast on the housing or tubular shaft 38. This shaft is rotatably supported in bearings 39 carried by a housing 41 which also carries the fields 42 for the motor.

A speed changer unit indicated generally at 43 is enclosed in a housing 44 formed preferably as a continuation of the housing 41. This speed changer unit preferably comprises a central high-speed member or roller 46 and a plurality of planetary rollers 47, which are rotatably mounted upon axles 48 carried by a rotary cage 49, the cage constituting the low-speed member. A binding pressure is exerted upon the rollers 46 and 47 in accordance with operating conditions by means carried by the housing 44 and indicated at 51. A speed-changer of this general type is fully disclosed in the patent to Garrard, No. 1,709,345, issued April 16, 1929, and therefore is only briefly referred to here. The central shaft or high-speed member of this speed changer unit is connected to the tubular shaft 38 and may be made integral therewith, as shown. The low-speed member or rotary cage 49 is formed integral with or rigidly connected to a short intermediate tubular shaft 52.

A shaft 53 is arranged to extend through the tubular shafts 52 and 38, being rotatably supported by bearings (not shown). The short tubular shaft 52 carries a clutch jaw 54, which is adapted to be engaged by a movable clutch jaw 56 splined on the adjacent portion of the inner shaft. Likewise at the other end of the prime mover a clutch jaw 54' is keyed on the end portion of the tubular shaft 38 and is adapted to be engaged by a movable jaw 56', which is splined on the adjacent portion of shaft 53. To assure that these clutches will not be engaged at the same time there is provided an intercontrol mechanism comprising pivotally mounted clutch operating levers 57 and 58, which engage annular grooves 59 in the clutch jaws 56, 56'. At their upper ends these levers are connected by a rigid link 61, thereby making it impossible to have both clutches engaged at the same time.

Power is transmitted from the shaft 53 of the driving unit through a cone clutch, indicated generally at 62, to the worm shaft 31. This clutch comprises a member 63 keyed on shaft 53 and having an interior conical surface which is adapted to be engaged by the outer conical surface of a member 64 carried by the worm shaft. The latter member is slidable longitudinally of the worm shaft and has an annular groove 66 in which an operating member (not shown) is disposed for engaging and disengaging the clutch. A clutch of this type is fully disclosed in the patent to George H. Knight, No. 1,544,993, issued July 7, 1925 to which reference may be had for a more complete description of the construction and mode of operation thereof.

In operation of the apparatus with the control levers 57 and 58 shifted to their right-hand position, as viewed in the drawings, power is transmitted directly from the tubular armature shaft to the inner shaft and from the latter through the clutch to worm shaft for operating the shaper. When so arranged the driving worm may be operated efficiently at any of the various speeds for which the motor is wound. This arrangement therefore provides a range of relatively high operating speeds. When lower speeds are desired the levers 57, 58 may be shifted to their left-hand position so as to engage the jaw clutch on the right and to cause power to be transmitted from the hollow armature shaft to the central roller or high speed member of the speed changer unit. This causes the short tubular shaft, and likewise the worm shaft, to be operated at reduced speeds. In this manner a wide range of relatively high and low operating speeds are made instantly available. At the same time the apparatus is compact and efficient in operation.

As power is transmitted to the worm shaft the worm wheel is set in rotation and likewise causes the crank arm 28 to rotate, thereby reciprocating the slidable block 26 in the channel 24 of the stroke arm 18 as the latter receives a forward and return pivotal motion due to the operation of this mechanism. This motion of the crank arm is likewise transmitted through the link 21 to the ram which is accordingly given a reciprocatory motion comprising a relatively slow working stroke, or movement to the right as viewed in Fig. 1, and a quick return stroke.

The use of the driving worm and worm wheel for operating the stroke arm and ram assures a smooth even flow of power for operating the ram at substantially constant speed particularly during the working stroke. In this way the usual disadvantages, such as the expense of finishing or lapping spur gearing for operating the ram, are avoided. These improvements are made possible largely by the improved change speed driving unit. Heretofore it has not been possible to obtain the desired speed ratios from worm gearing where a speed reducer is also employed. As the driving worm and worm wheel are in constant enmeshment the usual impacts of engaging teeth do not occur. There is therefore no reason for resorting to expensive finishing operations in the manufacture of the worm gearing.

It should be understood that the present disclosure is for the purpose of illustration only and that this invention includes all modifications and equivalents which fall within the scope of the appended claims.

We claim:

1. The combination of a machine comprising a reciprocable member, a stroke arm for reciprocating the member, a worm wheel for operating the stroke arm, a driving worm in engagement with the worm wheel, a speed-change power-transmitting unit comprising a prime mover and toothless friction gearing in end to end aligned relation coaxial with the driving worm, means independent of the gearing for transmitting power directly from the prime mover to the driving worm, and means for transmitting power from the prime mover through the toothless friction gearing to the driving worm.

2. The combination of a machine comprising a reciprocable member, a stroke arm, a worm wheel for operating the stroke arm, a driving worm in engagement with the worm wheel, a speed-change power-transmitting unit coaxial with the driving worm and comprising a prime mover and a central raceway in juxtaposed coaxial relation, satellite rollers having smooth, substantially continuous surfaces of revolution engaging the raceway, means for effecting driving engagement between the rollers and the raceway in accordance with operating requirements, means independent of the raceway and the rollers for transmitting power directly from the prime mover to the driving worm, and means for transmitting power from the prime mover to the raceway and thence through the rollers to the driving worm.

3. The combination with a machine comprising a work support, and a cutting tool, of means for effecting relative reciprocatory motion between the work support and the cutting tool, said means comprising a worm wheel crank gear, a worm for operating said gear, a speed change power transmitting unit comprising toothless friction gearing, means for transmitting power to said worm independently of said toothless friction gearing, and means for transmitting power through said toothless friction gearing to said worm.

4. The combination with a machine comprising a work support, and a cutting tool, of means for effecting relative reciprocatory motion between the work support and the cutting tool, said means comprising a worm wheel crank gear, a worm for operating said gear, a speed change power transmitting unit comprising a prime mover, toothless friction gearing, means for transmitting power from the prime mover through the toothless friction gearing to said worm, and means for transmitting power from the prime mover to said worm independently of the toothless friction gearing.

5. The combination of a machine of the class described comprising a reciprocating ram, a single shaft for transmitting power to said machine for operating the latter, means for transmitting power from said shaft to said ram comprising worm gearing, a prime mover, speed change mechanism, means for transmitting power from the prime mover through the speed change mechanism to said single shaft for causing the latter to operate said machine, and means for transmitting power from the prime mover directly to said single shaft without transmitting power through said speed change mechanism so that said machine may be operated directly at the speed of the prime mover.

6. The combination of a machine comprising a work support, a cutting tool, a worm wheel crank gear for effecting relative reciprocatory motion between the work support and the cutting tool, a single shaft for transmitting power to said machine for operating the latter, a worm carried by said shaft and meshing with said worm wheel crank gear, a prime mover, speed change mechanism, means for transmitting power from the prime mover through the speed change mechanism to said single shaft for causing the latter to operate said machine, and means for transmitting power from the prime mover directly to said single shaft without transmitting power through said speed change mechanism so that said machine may be operated directly at the speed of the prime mover.

ERNEST R. LLEWELLYN.
GEORGE H. HIGGINS.